United States Patent [19]
Hypes et al.

[11] Patent Number: 6,126,299
[45] Date of Patent: Oct. 3, 2000

[54] LASER LIGHT NAVIGATIONAL SAFETY SYSTEM FOR IMPROVED DETECTABILITY IN LOW VISIBILITY CONDITIONS

[75] Inventors: James Hypes, Woodbridge, Va.; Alvin Hypes, Lutz, Fla.; Martin Abbott, Fairfax, Va.

[73] Assignee: James S Hypes, Woodbridge, Va.

[21] Appl. No.: 08/947,341

[22] Filed: Oct. 8, 1997

[51] Int. Cl.[7] .............................. F21K 7/00; B60Q 1/26
[52] U.S. Cl. .................... 362/259; 362/231; 362/477; 362/544; 340/985
[58] Field of Search .................... 340/984, 985; 362/230, 231, 244, 249, 259, 470–472, 477, 588, 540, 544, 545

[56] References Cited

U.S. PATENT DOCUMENTS

| | | | |
|---|---|---|---|
| 3,710,098 | 1/1973 | Walden | 340/985 |
| 4,290,043 | 9/1981 | Kaplan | 340/984 |
| 4,722,037 | 1/1988 | Davis | 362/231 |
| 4,884,173 | 11/1989 | Cassidy | 362/477 |
| 4,916,445 | 4/1990 | Crossley | 362/470 |
| 5,504,480 | 4/1996 | Bourbin | 362/465 |
| 5,508,895 | 4/1996 | Wagoner, Jr. | 362/477 |
| 5,572,183 | 11/1996 | Sweeney | 340/332 |
| 5,636,916 | 6/1997 | Sokolowski | 340/984 |

*Primary Examiner*—Alan Cariaso

[57] ABSTRACT

The present invention provides a navigational safety lighting system for use in low visibility conditions caused by fog, mist, rain, snow or other particulate matter in the atmosphere. A laser light source is utilized which emits a beam of laser light that is visible to the naked eye when it strikes the particulate matter in the atmosphere. The laser light source may be mounted on an air, water or land craft, or may be mounted on navigational or other objects to identify them in such low visibility conditions. Also, the laser light source on an air, water or land craft may be directed in the direction of movement of the craft to identify obstacles in the path of the craft in such low visibility conditions.

13 Claims, 4 Drawing Sheets

LASER LIGHT NAVIGATIONAL SAFETY SYSTEM FOR IMPROVED DETECTABILITY IN LOW VISIBILITY CONDITIONS

TECHNICAL FIELD

The present invention relates, in general, to navigational, warning or marking lights used on aircraft, water craft or other movable or stationary objects. More particularly, the present invention is directed to the use of laser lights to supplement the visible light output of standard running lights found on aircraft, boats, ships or the like in poor visibility conditions, and also to provide a warning of or to mark objects in the path of aircraft, boats, ships or the like in such conditions.

BACKGROUND OF THE INVENTION

Maritime regulations have long required the use of navigational "running" lights on boats and ships when the vessels are underway at night or in poor visibility conditions. Such lighting systems are well known and generally include lights of specified colors located on the bow and stern of the vessel. The bow lights are required to be green to starboard and red to port, whereas stern lights are clear. In this scheme, an observer can determine from the light pattern visible to him or her what direction a boat is moving. If an observer sees both red and green lights, it may be surmised that a boat is approaching head-on. On the other hand, if an observer sees only a red or green light, it can generally be assumed that a boat is either traveling on a non-intersection course parallel to that of the observer, or an intersecting course perpendicular to the observer's. For example, if an observer sees only a green light in its path, it may be assumed that a boat is passing from port to starboard in front of the observer's boat. Conversely, if only a red light is seen, this indicates a boat passing from starboard to port in front of the observer's boat. Spotting a white or clear light, without adjacent or also visible green or red lights indicates that the observer is directly astern of a boat.

On smaller boats, the red and green lights are typically contained in a common housing which incorporates a partitioned colored lens, or perhaps separate colored lenses. In contrast, larger boats or ships often have the running lights separated from each other, and frequently they are mounted along the ship sides, somewhat aft of the bow.

These navigational lighting systems or schemes have proven so reliable that their use on water craft is almost universal and similar systems have been designed for use with aircraft. However, while these lighting systems work well on a clear night, their effectiveness is significantly reduced in poor visibility conditions such as in clouds, fog, mist, rain, or snow. To compensate for such reductions in light visibility, air and water craft operators have developed auxiliary signalling systems to broadcast their position. For example, horns or bells have been used to alert others of a craft's position on the water. However, using horns or bells accurately is generally limited to larger ships or boats staffed with knowledgeable crews to broadcast and interpret the sounds. Smaller boats, such as pleasure boats, may include a small hand-held horn device, but its use is often haphazard and is frequently misunderstood by someone attempting to determine another boat's position from the timing and direction of the horn blasts. Although, more recently, sophisticated radar or electronic devices have been developed and refined to indicate the position of other craft in the vicinity of a boat or airplane, such equipment is expensive and its use is generally confined to only large, well equipped craft.

Also, in poor visibility conditions, the operator of an aircraft, watercraft or land-type vehicle may not see or otherwise be aware of objects in the path of the craft or vehicle, with the result that collisions with such objects may occur with resultant damage to the craft or vehicle and injury to the passengers thereof.

Accordingly, a need exists for an inexpensive means to increase the visibility of aircraft, water craft and the like in poor visibility conditions that is effective for small and large craft alike. Also, there is a need for a signaling system that does not require a boat operator to learn and interpret a set of sound signals to indicate a boat's path or direction. Moreover, there is a need for a signaling system for adverse light conditions that is simple and inexpensive to install on existing air, water and land craft, in addition to being provided as standard equipment on such craft. Additionally, there is a need for a simple and inexpensive system for detecting or marking an object in the path of an aircraft, watercraft or land craft in low visibility conditions to prevent a collision therewith. These needs have been satisfied by the invention described herein.

SUMMARY OF THE INVENTION

In one embodiment, the present invention provides an easy to install bow running light device which can be used in conjunction with the standard green and red lights to provide auxiliary light for poor visibility conditions. More particularly, the invention provides a laser lighting system for use in poor visibility situations that can be easily combined with existing running lights to provide superior light beam emissions to signal or indicate a boat's presence, speed and direction of movement relative to an observer. The inventive signaling system is easy to install, either as after-market equipment or in new or original equipment installations and requires no extra training, or effort, in its use and interpretation.

The laser lighting system of the present invention, in another embodiment, may be used in low visibility conditions to detect or warn the operator of an aircraft, watercraft or land craft of an object in the path of the craft to prevent a collision therewith, or may be used to mark certain objects in low visibility conditions so that the operator can safely negotiate a path around or through them.

DETAILED DESCRIPTION OF THE INVENTION

Figure 1:
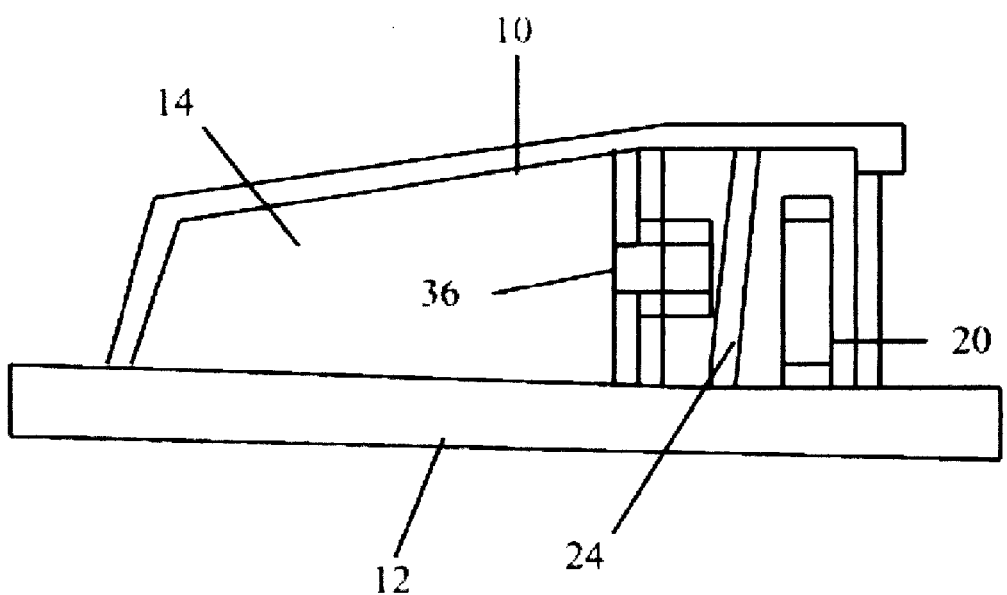
FIG. 1 is a side elevational view of a light assembly of the invention.

The present invention provides an auxiliary lighting system for adverse light conditions that may be used in combination with standard navigational lights on aircraft, water craft or other craft. The auxiliary lighting system may be switched on by the craft's operator to provide beams of light that penetrate through water, fog, mist, rain, or snow under conditions when the visibility of standard running lights is diminished by such weather or cannot be seen by underwater divers or the like.

The beams of light are provided one or more lasers mounted in a housing so as to project a beam of light, for example, away from the craft in the direction of the craft's movement, or downwardly into the water so that a boat may be seen at night by divers or the like who are underwater. Light waves consist of electromagnetic radiation which, even if vibrating at a visible frequency, remain essentially invisible until the light strikes solid matter. Most light sources, including incandescent and fluorescent light sources, generate light which radiates in all directions. Laser light is coherent, meaning that it radiates in a single direction or "beam". A beam of laser light will travel through air and will not be visible until the light strikes solid matter, at which point a "dot" appears on that solid matter. Because of this characteristic, laser light is commonly used with intrusion detection alarm systems.

If a laser beam passes through air containing particulate matter such as water droplets or ice crystals, the light illuminates only those particles of matter that are within the actual area of the laser beam. Since the laser light is coherent (meaning that each photon of laser light is directed in the same direction as every other photon emanated by the laser light source), the laser light does not scatter in divergent directions from the main beam's direction unless a photon of laser light actually strikes a particle of matter. As the air becomes filled with water droplets or ice crystals, more and more of the laser light will strike solid particulate matter in the air and will be redirected away from the beam, i.e., toward other directions which may be intercepted by the eye of a human being. When this occurs, the laser light beam becomes visible. As the density of the particulate matter becomes greater, more laser light strikes solid matter and is redirected away from the normal path of the beam, thereby making the perceived intensity of the laser beam greater to persons situated outside the path of the laser beam. The perceived intensity of the laser beam is dependent upon the density of particulate matter being illuminated within the path of the laser beam, and also upon the power of the laser light source.

Accordingly, when the laser is activated by the craft's operator in such adverse weather conditions, a visible beam of light appears because of the contact of the laser beam with the particles of water vapor or ice crystals in the air. Thus, in contrast to the single dot that appears when a laser beam strikes a solid object under normal lighting conditions, in adverse weather conditions a visible beam of light can be seen emanating from the craft in the direction of the craft's movement.

The size of the visible beam is largely a function of the size and intensity of the laser. Accordingly, the size required of the beam to provide sufficient warning to approaching craft will depend upon the craft's speed and its surrounding environment. For example, to provide an effective safety warning system for air-craft, the beam must propagate further from the craft so as to allow sufficient time for approaching aircraft to steer clear of the signaling craft after identifying the beam. In contrast, boats typically travel at slower speeds and require less time to maneuver around oncoming craft to avoid a collision. Thus, less beam propagation may be required to provide adequate safety in water craft. Additionally, the diameter of the resultant beam may advantageously be adjusted depending upon the size and speed of the craft. Accordingly, the size and intensity of the laser necessary to provide adequate safety may vary from craft to craft.

As one of skill in the art will recognize, lasers useful in the invention may be any laser light source that provides a beam of visible light of suitable size and intensity for a specific craft. Preferably, the laser provides a beam of colored light to enhance its visibility. For example, colored lasers emitting electromagnetic radiation at a wavelength in the orange-red (650–770 nanometers) and green (500–560 nanometers) regions of the visible spectrum are generally preferred.

The laser light assembly of the invention may be contained in a separate housing, or within the same housing containing the standard running lights. For small craft, it is preferred that the laser be contained in the same housing as the standard running lights to reduce the number of lighting assemblies that must be mounted on the bow of the boat. Furthermore, the laser light system may include more than one laser light source for producing multiple beams of light. Additionally, different colored lasers may be utilized to provide beams of different colors. For example, the housing may be equipped with laser light sources emitting beams of two different colors, such as red and green, in keeping with the color scheme adopted for navigational running lights. Such an embodiment is described in further detail below with reference to the accompanying drawings.

Figure 2:
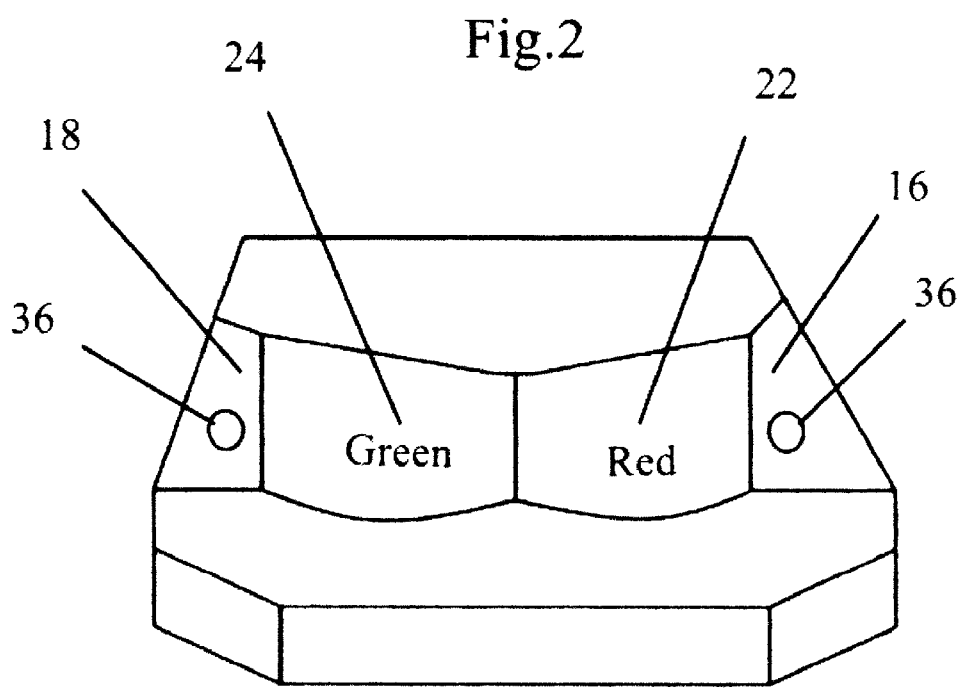
FIG. 2 is a front elevational view of the light assembly illustrated in FIG. 1.
Figure 3:
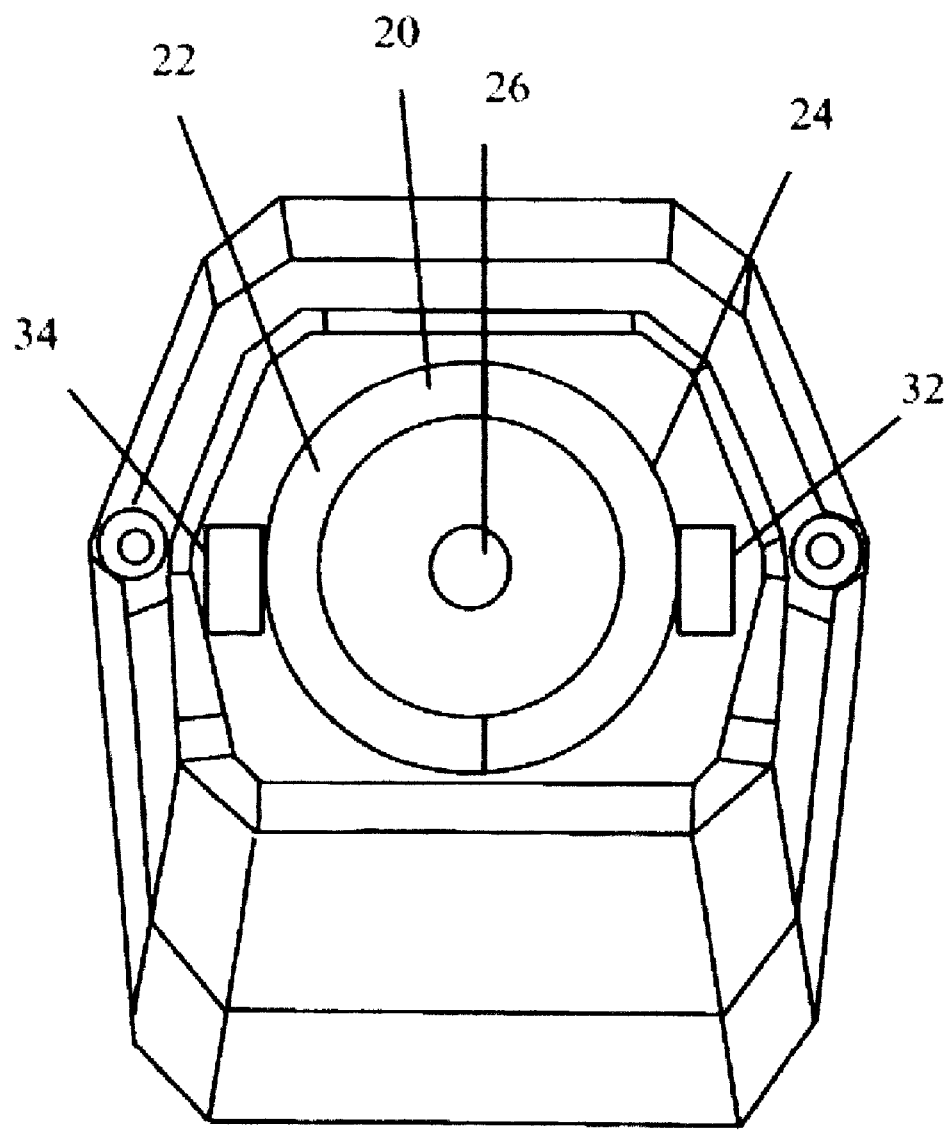
FIG. 3 is a top cross-sectional view of the light assembly illustrated in FIG. 1 taken along line 3—3.

Referring to FIGS. 1–3, there is shown a typical running light assembly 10 that may be mounted on the bow of a boat. The running light assembly comprises a base 12 and a top housing 14 which is hollow and serves to encase the lighting system.

The lighting system includes two distinct subsystems. The first subsystem is a conventional running light that is used when the boat is being operated at night or in low light conditions. This subsystem includes a lens 20 comprised of two portions, one being red 22 and the other green 24. It is to be noted that the above-described lens is shown as two colored semicircular pieces joined together, but this is merely exemplary of the various shapes or designs which may be used.

Inside the housing 14, and behind or within the lens 20 is a source of noncoherent light such as a light bulb 26 (see FIG. 3). The light bulb may be connected to the boat's electrical system or powered by a battery pack, similar to a flashlight battery pack. When the bulb is energized, the light will pass through each side of the circular lens and red and green light will be simultaneously generated.

The second subsystem comprises one or more laser light sources 32 and 34 mounted within housing 14 adjacent apertures 36 in front wall sections 16 and 18. The laser light sources may emit a beam or beams of any desired color. For example, laser light source 32 may emit a green beam and is positioned adjacent to the green portion 24 of the running light lens. Laser light source 34 may emit a red beam and it is mounted in the housing to be adjacent to the red portion 22 of running light lens 20. Because sources of red laser light are relatively inexpensive and sources of laser light of other colors are relatively expensive, it may be desirable in smaller craft to use one or more sources of red laser light only. The laser lights may be connected to the boat's electrical system or powered via a separate battery pack.

Figure 4:
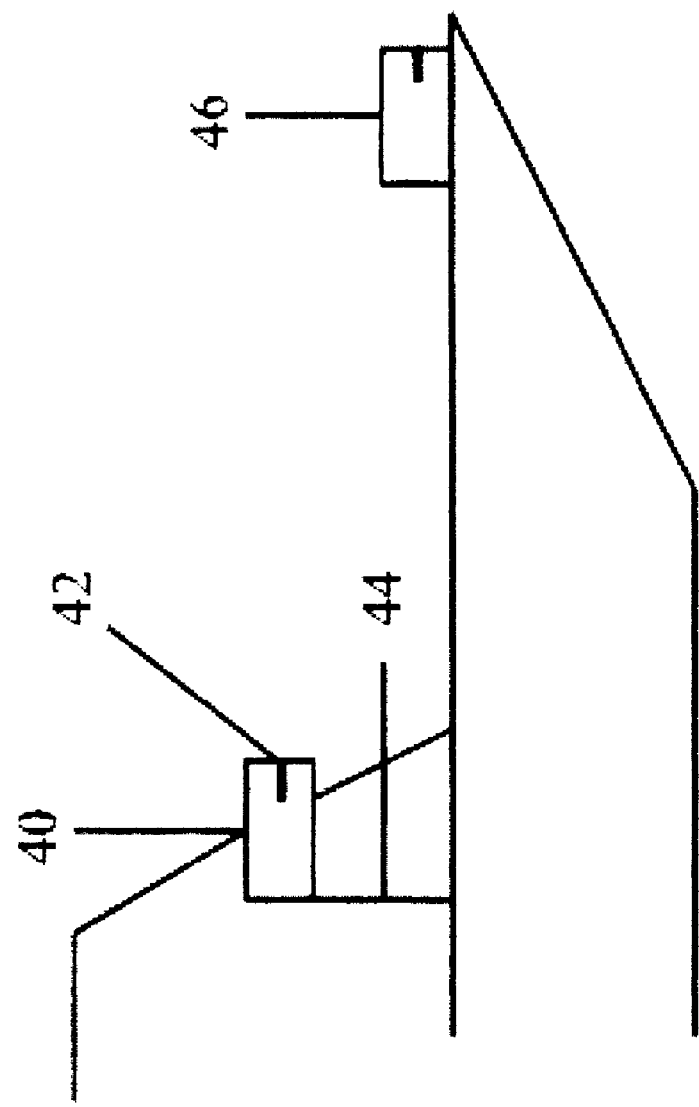
FIG. 4 is a side elevational view of an alternate embodiment of a light assembly of the invention.

While the invention has been described above in combination with a running light housing, it is within the realm of this invention that the laser lights may be installed in a housing separate from the boat's running lights, and mounted adjacent thereto or removed therefrom. For example, FIG. 4 shows laser light source 42 installed in a housing 40 attached to a bracket 44 above conventional running light 46. Further, on large vessels, where the red and green running lights are not mounted in a common housing, the red laser light may be mounted with, or closely adjacent to the red running light and the green laser light may similarly be associated with the green running light.

In accordance with the present invention, the laser beam or beams may be used to warn the operator of the aircraft, watercraft or the like of an object or obstacle in the path of the craft in low visibility conditions caused by fog, mist, rain, snow or the like. In such conditions, the laser beam will be visible to the operator and will terminate in an enlarged end of greater intensity when it strikes an object or obstacle in the path of the craft, thereby providing an indication of the object or obstacle to the operator of the craft who can then take appropriate action to avoid it.

It is also within the scope of the present invention to use one or more laser beams to mark navigational or other objects such as buoys, channel markers, docks, piers, runway markers, tunnels, bridges or the like so that the operator of an air, water or land craft will be aware of their location in poor visibility conditions caused by fog, mist, rain, snow or the like. In such conditions, the laser beam or beams would be visible to the operator. The invention could also be used to identify a boat or ship to underwater divers or the like at night or when visibility is poor by directing the laser beam or beams downwardly into the water.

What is claimed is:

1. A navigational safety lighting assembly that is enhanced for use in low visibility conditions caused by fog, mist, rain, snow or other particulate matter in the atmosphere, comprising: a housing having mounted therein at least one light source emitting electromagnetic radiation in the visible spectrum when electrically energized, said radiation being substantially coherent and forming a beam emanating from said source, whereby said beam is visible to the naked eye when said beam strikes the particulate matter in the atmosphere, wherein said light source is a laser emitting a wavelength from 500 nm to 770 nm.

2. The safety lighting assembly of claim 1, wherein said electromagnetic radiation has a wavelength of from about 500 to 560 nanometers.

3. The safety lighting assembly of claim 1, wherein two laser light sources are mounted within said housing.

4. The safety lighting assembly of claim 3, wherein said laser light sources emit radiation of different wavelengths.

5. The safety lighting assembly of claim 4, wherein one of said laser light sources emits radiation at a wavelength of from about 500 to 560 nanometers and the other of said laser light sources emits radiation at a wavelength of from about 650 to 770 nanometers.

6. A marine standard equipment navigational safety lighting assembly comprising a housing, said housing having at least one opening therein in which a lens is mounted, a first source of noncoherent electromagnetic radiation within said housing whereby when said first source is energized noncoherent radiation having a wavelength in the visible spectrum is emitted through said lens, and at least one second source of substantially coherent electromagnetic radiation of 500 to 770 nm in the visible spectrum within or affixed to said housing, whereby when said second source is energized, said coherent radiation forms a beam emanating from said second source which is visible when the beam strikes particular inclement weather matter in the atmosphere which causes low visibility conditions.

7. The safety lighting assembly of claim 6, wherein of said second source electromagnetic radiation has a wavelength of from about 635 to 770 nanometers.

8. The safety lighting assembly of claim 6, wherein of said second source electromagnetic radiation has a wavelength of from about 500 to 560 nanometers.

9. The safety lighting assembly of claim 6, wherein said second source comprises one or more laser light sources mounted within said housing.

10. The safety lighting assembled of claim 9, wherein said laser light sources emit radiation of different wavelengths.

11. The safety lighting assembly of claim 10, wherein one of said second light sources emits radiation at a wavelength of from about 500 to 560 nanometers and the other of said laser light sources emits radiation at a wavelength of from about 635 to 770 nanometers.

12. The safety lighting assembly of claim 11, wherein said lens has a portion that emits noncoherent electromagnetic radiation having a wavelength of from about 500 to 560 nanometers and a second portion that emits nancoherent radiation having a wavelength of from about 635 to 770 nanometers.

13. The safety lighting assembly of claim 11, wherein said laser light source emitting electromagnetic radiation having a wavelength of from about 635 to 770 nanometers is adjacent to said lens portion emitting radiation having a wavelength of from about 635 to 770 nanometers, and said laser light source emitting electromagnetic radiation having a wavelength of from about 500 to 560 nanometers is adjacent said lens portion emitting radiation having a wavelength of from about 635 to 770 nanometers.

* * * * *